United States Patent [19]

Fox

[11] Patent Number: 4,766,327
[45] Date of Patent: Aug. 23, 1988

[54] CIRCUIT AND METHOD FOR SYNCHRONIZING POWER SOURCES IN A PARALLEL AC ELECTRICAL POWER SYSTEM

[75] Inventor: David A. Fox, Lima, Ohio

[73] Assignee: Westinghouse Electric Corp., Pittsburgh, Pa.

[21] Appl. No.: 80,032

[22] Filed: Jul. 31, 1987

[51] Int. Cl.⁴ .............................................. H02V 3/16
[52] U.S. Cl. ...................................... 307/87; 307/64; 307/66; 307/57; 363/95; 363/165
[58] Field of Search ....................... 307/3, 4, 57, 64, 66, 307/73, 75, 85, 86, 87; 363/95, 96, 97, 131, 132, 164, 165

[56] References Cited

U.S. PATENT DOCUMENTS

| | | |
|---|---|---|
| 2,862,111 | 11/1958 | Richards, Jr. et al. . |
| 3,069,556 | 12/1962 | Apfelbeck et al. . |
| 3,210,556 | 10/1965 | Billings . |
| 3,294,976 | 12/1966 | Tipton et al. . |
| 3,444,387 | 5/1969 | Billings et al. . |
| 3,539,820 | 11/1970 | Kessler . |
| 3,588,519 | 6/1971 | Luebrecht . |
| 3,683,199 | 8/1972 | Billings et al. ........................ 307/87 |
| 3,986,098 | 10/1976 | Tamii et al. ........................ 307/64 X |
| 4,177,389 | 12/1979 | Schott ..................................... 307/64 |
| 4,238,691 | 12/1980 | Ebert, Jr. ............................... 307/66 |
| 4,251,735 | 2/1981 | Coleman ............................ 363/95 X |
| 4,251,736 | 2/1981 | Coleman ............................ 363/95 X |
| 4,508,974 | 4/1985 | Henderson ........................ 307/87 X |
| 4,510,399 | 4/1985 | Baker ................................ 363/95 X |
| 4,652,770 | 3/1977 | Kumano .............................. 307/66 |
| 4,703,193 | 10/1987 | Kawabata ........................... 307/66 |

Primary Examiner—William M. Shoop, Jr.
Assistant Examiner—Paul Ip
Attorney, Agent, or Firm—R. P. Lenart

[57] ABSTRACT

Power sources of a parallel AC electrical power system are synchronized by producing a voltage difference signal representative of the difference in output voltages of the power sources and demodulating that signal to produce a frequency control signal and a voltage magnitude control signal. The output frequency and voltage magnitude of at least one of the power sources is varied in response to the frequency control signal and voltage magnitude control signals, respectively, to minimize the difference in output voltages between the power sources.

9 Claims, 2 Drawing Sheets

CIRCUIT AND METHOD FOR SYNCHRONIZING POWER SOURCES IN A PARALLEL AC ELECTRICAL POWER SYSTEM

BACKGROUND OF THE INVENTION

This invention relates to the control of power sources in a parallel AC electrical power system and, more particularly, to circuits and methods for synchronizing the outputs of those power sources.

AC electric power systems are usually connected in parallel to increase total system rating or in certain cases such as airborne power systems, to increase reliability. One well known type of aircraft electric power system is the DC link variable speed constant frequency (VSCF) system. Such systems include a plurality of power pole switching elements which synthesize an AC output by switching current from a pair of DC link conductors in a fixed switching pattern, which may be generated by a microprocessor or other digital circuit. When these systems are to be operated in parallel with each other or with another source such as a ground power cart, the outputs of the power sources must be synchronized. Perfect synchronization requires the matching of both the phase angle and voltage amplitude of the power source outputs.

Prior synchronization circuits controlled the phase angle and voltage amplitude of the power source outputs with independent circuits. Quite often the voltage was not adjusted, but was maintained by the individual set point accuracy of the voltage regulators in the two systems. The phase angle control circuits responded to zero cross-overs of the AC waveform. Waveform distortion could cause significant errors. Because typical inverter and external source impedances are 0.1 per unit or less, small voltage errors can produce significant current transients at the instant of paralleling. Paralleling controls or load division circuits have been developed for inverter power sources as illustrated by U.S. Pat. No. 4,510,399, issued Apr. 9, 1985, and application Ser. Nos. 938,652 (now U.S. Pat. No. 4,707,142, issued Nov. 17, 1987), 938,661 and 938,702 all filed Dec. 5, 1986. These circuits actively control the frequency and voltage of an inverter output to cause the proper sharing of real and reactive load. It is desirable to include a synchronization circuit which is compatible with existing load division and control circuits.

SUMMARY OF THE INVENTION

This invention encompasses a circuit and method for synchronizing a controllable frequency, controllable voltage, electrical power source with a second electrical power source wherein a voltage difference signal representative of the difference in output voltages between the power sources is demodulated to produce a frequency control signal and a voltage magnitude control signal. The output frequency of the controllable power source is varied in response to the frequency control signal and the output voltage magnitude of the controllable power source is varied in response to the voltage magnitude signal to minimize the difference in output voltages between the electrical power sources.

A circuit which performs these functions includes a monitoring circuit which produces a voltage difference signal representative of the difference in output voltages between the two power sources and a circuit for inverting that voltage difference signal. The voltage difference signal and inverted voltage difference signal are applied to a demodulator to produce the frequency control signal and voltage magnitude control signal. The output frequency and voltage magnitude of the controllable power source are varied in response to the frequency control signal and voltage magnitude control signal in accordance with known techniques as illustrated in the above-cited patent and patent applications.

Circuits constructed in accordance with this invention are compatible with existing real and reactive control circuits used in VSCF power systems. These synchronizing circuits respond to the total power source output waveform, not just zero cross-overs, for phase angle control. Therefore, phase angle and voltage control are combined into one simple circuit.

DESCRIPTION OF THE PREFERRED EMBODIMENT

Figure 1:
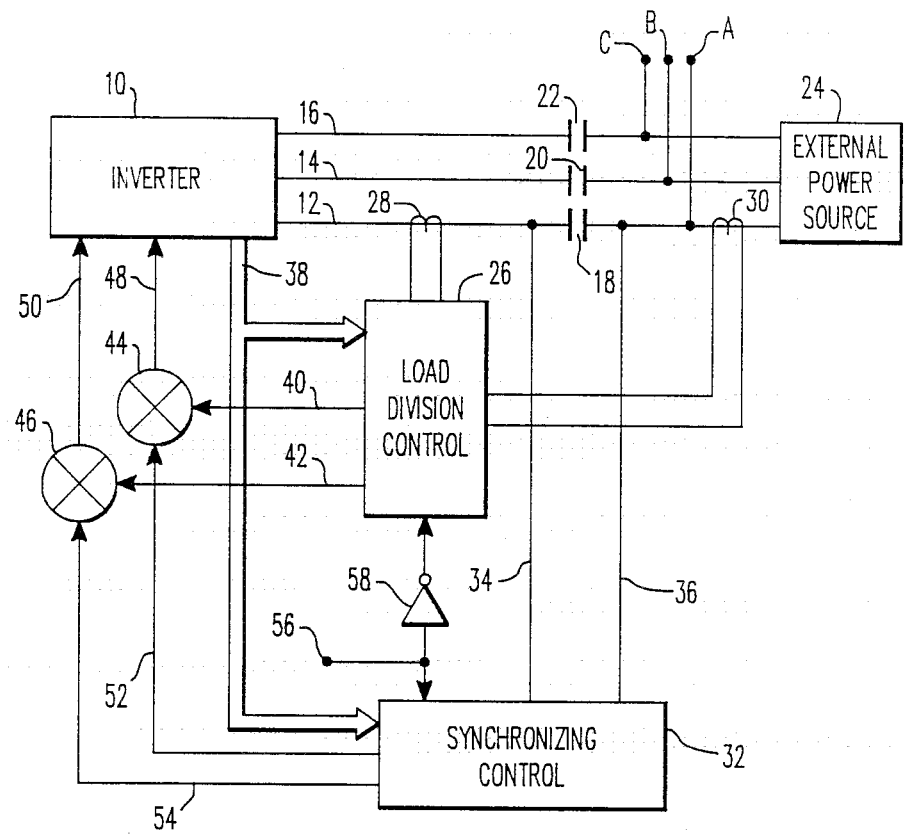
FIG. 1 is a block diagram of a parallel source AC power system which includes synchronizing controls constructed in accordance with one embodiment of the present invention.

Referring to the drawings, FIG. 1 is a block diagram of a parallel source AC electrical power system having a synchronizing control constructed in accordance with one embodiment of the present invention. This system includes a controllable frequency, controllable voltage electrical power source in the form of an inverter 10 having a multiple phase output on lines 12, 14 and 16. These output lines are connectable through a plurality of contact pairs 18, 20 and 22 to the output of an external power source 24 which may be, for example, a ground power cart or an auxiliary power unit. When contact pairs 18, 20 and 22 are closed, the inverter 10 and external power source 24 operate in parallel to supply the main power bus output phases A, B and C. A load division control circuit 26, which may be constructed in accordance with the previously mentioned patent and patent applications, is connected to current transformers 28 and 30 to monitor the load current of phase A delivered by the inverter 10 and external power source 24, respectively.

A synchronizing control 32 constructed in accordance with the present invention monitors the voltage appearing across contact pair 18 on lines 34 and 36, prior to closure of those contacts. A data bus 38 is connected to the internal inverter pattern generator and provides square wave marker signals as required to demodulate real and reactive components of the power system currents. These signals are required by the prior art load division control circuit and illustrated in U.S. Pat. No. 4,510,399. The square wave marker signals are also delivered to the synchronizing control circuit 32. In accordance with the prior art, a load division control circuit produces a voltage control signal on line 40 and a frequency control signal on line 42. These signals are delivered to junction points 44 and 46, respectively, and are passed to the inverter 10 on lines 48 and 50, respectively.

The synchronizing control circuit of this invention monitors the difference voltage signal appearing on lines 34 and 36 and demodulates that signal in accordance with the square wave marker signals on data bus 38 to produce a voltage magnitude control signal on line 52 and a frequency control signal on line 54. Terminal 56 is provided to receive a signal which enables the synchronizing control circuit and is inverted by inverter 58 to disable the load division control circuit 26. This signal, which may be in the form of a logic signal, acts to enable the synchronizing control 32 prior to closure of the contacts of contact pair 18. Once the inverter outputs have been varied in response to the voltage magnitude control signal on line 52 and the frequency control signal on line 54 to minimize the difference voltage appearing across contact pair 18, the synchronizing enable signal on terminal 58 is removed or altered to disable the synchronizing control and enable the load division control when the contacts of contact pair 18 are closed.

Figure 2:
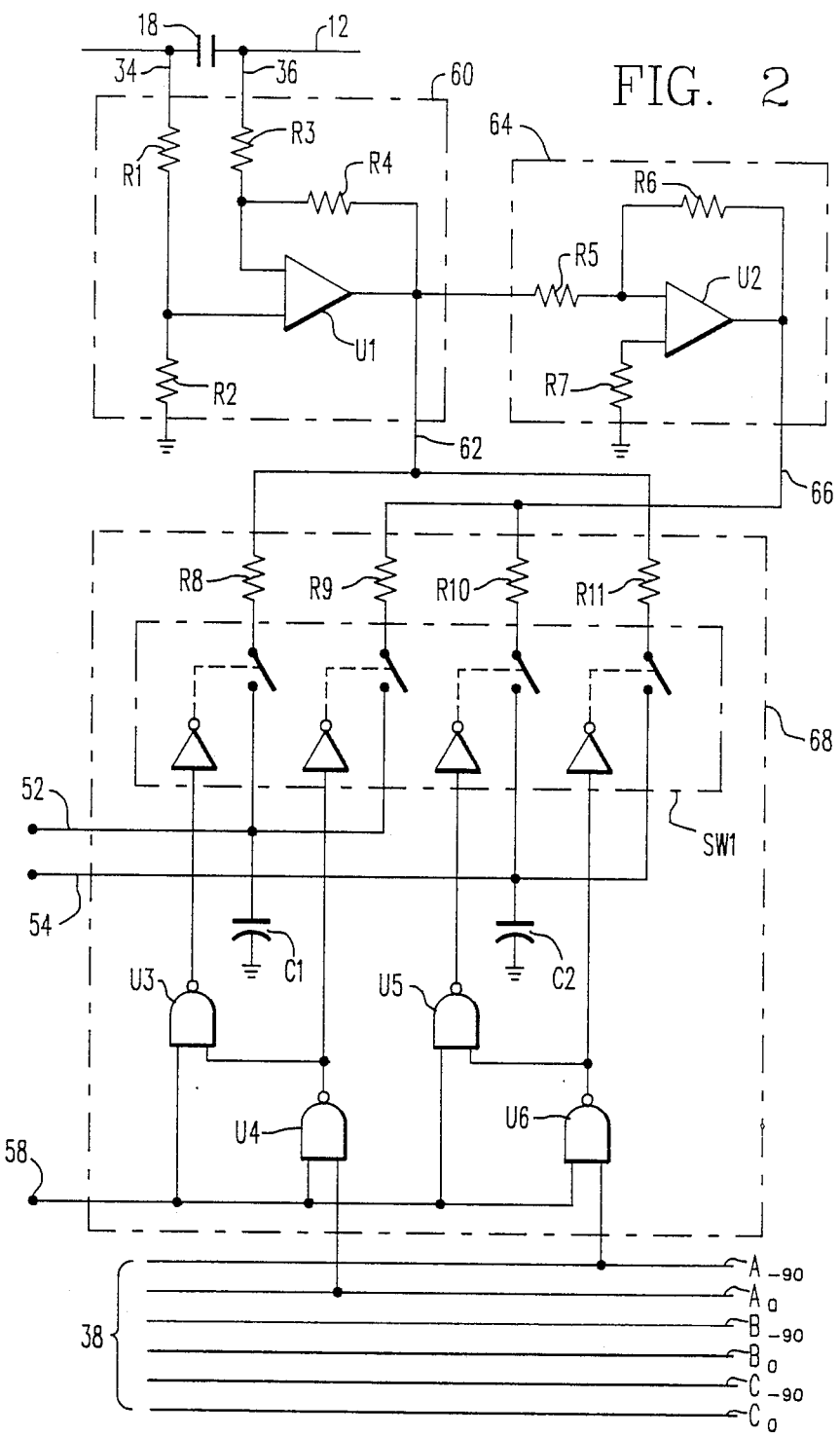
FIG. 2 is a schematic diagram of the synchronizing control circuit used in the power system of FIG. 1.

FIG. 2 is a schematic diagram of the synchronizing control circuit used in the power system of FIG. 1. An amplifier circuit 60 comprising operational amplifier U1 and resistors R1, R2, R3 and R4 monitors the difference voltage appearing across contact pair 18 and produces a voltage difference signal on line 62 which is representative of the difference in output voltages on phase A of inverter 10 and external power source 24. An inverting circuit 64 including operational amplifier U2 and resistors R5, R6 and R7 inverts the voltage difference signal to produce an inverted voltage difference signal on line 66. The voltage difference signal and inverted voltage difference signal are applied to demodulator 68 which comprises resistors R8, R9, R10 and R11; analog switch SW1; capacitors C1 and C2; and NAND gates U3, U4, U5 and U6.

A first pulse wave control signal $A_0$ which is in phase with the real component of phase A of the inerter output is applied to the input of NAND gate U4. A second pulse wave control signal $A_{-90}$ which is phased displaced from the first pulse wave control signal by −90 electrical degrees is applied to NAND gate U6. All of the NAND gates also receive the synchronization control enable signal from terminal 58. When the synchronization enable signal is at a predetermined level, which enables the demodulator 68, the outputs of the NAND gates cause the analog switch SW1 to switch the difference voltage signal on line 62 and the inverted difference voltage signal on line 66 at the appropriate times (in response to the voltage levels of the square wave marker signals) to produce a voltage magnitude control signal on line 52 and a frequency control signal on line 54. The operation of this demodulator is in accordance with U.S. Pat. No. 4,510,399 which is hereby incorporated by reference. Square wave marker signals $B_0$, $B_{-90}$, $C_0$ and $C_{-90}$, are also included on data bus 38 and may be used to control the other phases of the inverter output.

It should be apparent that the circuits illustrated in drawing FIGS. 1 and 2 perform a method for synchronizing a first controllable frequency, controllable voltage, electrical power source with a second electrical power source, which comprises the steps of producing a voltage difference signal representative of the difference in output voltage of the first controllable frequency, controllable voltage, electrical power source and the second electrical power source; and demodulating the voltage difference signal to produce a frequency control signal and a voltage magnitude control signal. Both the frequency control signal and voltage magnitude control signal which are produced by the demodulator are applied to the same frequency and voltage controls in the inverter as are used by existing load division control circuits. Furthermore, the timing signal inputs required by the demodulator are the same as those used in existing load division control circuits. Removal of the sync-enable control signal turns off the synchronization circuit demodulator switches when the load division control circuits are activated, thereby disabling the synchronizing circuit.

The present invention provides compatibility with existing real and reactive control circuits; responds to the total voltage difference waveform, not just zero crossover, for phase angle control; and combines both phase angle and voltage control into one simple circuit.

Although the present invention has been described in terms of what is at present believed to be its preferred embodiment, it will be apparent to those skilled in the art that various changes may be made without departing from the scope of the invention. It is therefore intended that the appended claims cover such changes.

What is claimed is:

1. A method for synchronizing a first controllable frequency, controllable voltage, electrical power source with a second electrical power source, comprising the steps of:
    producing a voltage difference signal representative of the difference in output voltages of a first controllable frequency, controllable voltage, electrical power source and a second electrical power source;
    demodulating said voltage difference signal to produce a frequency control signal and a voltage magnitude control signal; and
    varying the output frequency of said first electrical power source in response to said frequency control signal and varying the output voltage of said first electrical power source in response to said voltage magnitude signal, to minimize the difference in output voltages between said first and second electrical power sources.

2. A method for synchronizing a first controllable frequency, controllable voltage, electrical power source with a second electrical power source, as recited in claim 1, wherein said demodulating step comprises the steps of:
    generating a first pulse wave control signal which is in phase with the real component of the output of said first electrical power source;
    switching said voltage difference signal to a first synchronizer output line when said first pulse wave control signal is at a first predetermined voltage level;
    generating a second pulse wave control signal which is phase displaced from said first pulse wave control signal by 90 electrical degrees; and
    switching said voltage difference signal to a second synchronizer output line when said second pulse wave control signal is at a second predetermined voltage level.

3. A method for synchronizing a first controllable frequency, controllable voltage, electrical power source with a second electrical power source, as recited in claim 1, wherein:
    said voltage difference signal is representative of the difference in voltage on corresponding phases of said first and second electrical power sources.

4. A circuit for synchronizing a first controllable frequency, controllable voltage, electrical power source with a second electrical power source, comprising:

means for producing a voltage difference signal representative of the difference in output voltages of a first controllable frequency, controllable voltage, electrical power source and a second electrical power source;

means for demodulating said voltage difference signal to produce a frequency control signal and a voltage magnitude control signal; and means for varying the output frequency of said first electrical power source in response to said frequency control signal and varying the output voltage of said first electrical power source in response to said voltage magnitude signal, to minimize the difference in output voltages between said first and second electrical power sources.

5. A circuit for synchronizing a first controllable frequency, controllable voltage, electrical power source with a second electrical power source, as recited in claim 4, wherein said means for demodulating comprises:

means for generating a first pulse wave control signal which is in phase with the real component of the output of said first electrical power source;

means for switching said voltage difference signal to a first synchronizer output line when said first pulse wave control signal is at a first predetermined voltage level;

means for generating a second pulse wave control signal which is phase displaced from said first pulse wave control signal by 90 electrical degrees; and means for switching said voltage difference signal to a second synchronizer output line when said second pulse wave control signal is at a second predertimined voltage level.

6. A circuit for synchronizing a first controllable frequency, controllable voltage, electrical power source with a second electrical power source, as recited in claim 4, wherein:

said voltage difference signal is representative of the difference in voltage of corresponding phases of said first and second electrical power sources.

7. A circuit for synchronizing a first controllable frequency, controllable voltage, electrical power source with a second electrical power source, comprising:

means for producing a voltage difference signal representative of the difference in output voltages of a first controllable frequency, controllable voltage, electrical power source and a second electrical power source;

means for producing an inverted voltage difference signal representative of the difference in output voltages of a first controllable frequency, controllable voltage, electrical power source and a second electrical power source;

means for demodulating said voltage difference signal and said inverted voltage difference signal to produce a frequency control signal and a voltage magnitude control signal; and means for varying the output frequency of said first electrical power source in response to said frequency control signal and varying the output voltage of said first electrical power source in response to said voltage magnitude signal, to minimize the difference in output voltages between said first and second electrical power sources.

8. A circuit for synchronizing a first controllable frequency, controllable voltage, electrical power source with a second electrical power source, as recited in claim 7, wherein said means for demodulating comprises:

means for generating a first pulse wave control signal which is in phase with the real component of the output of said first electrical power source;

means for switching said voltage difference signal to a first synchronizer output line when said first pulse wave control signal is at a first predetermined voltage level;

means for generating a second pulse wave control signal which is phase displaced from said first pulse wave control signal by 90 electrical degrees; and means for switching said voltage difference signal to a second synchronizer output line when said second pulse wave control signal is at a second predetermined voltage level.

9. A circuit for synchronizing a first controllable frequency, controllable voltage, electrical power source with a second electrical power source, as recited in claim 7, wherein:

said voltage difference signal is representative of the difference in voltage on corresponding phases of said first and second electrical power sources.

* * * * *